United States Patent [19]

Lindner et al.

[11] 4,434,070

[45] Feb. 28, 1984

[54] GRANULATE-FORM POWDER AGGLOMERATES OF PULVERULENT RUBBER CHEMICALS AND A PROCESS FOR PRODUCTION

[75] Inventors: Wolfgang Lindner; Günter Arend, both of Dormagen; Carl-Dieter Barnikel, Cologne; Günter Frauenkron, Burscheid, all of Fed. Rep. of Germany

[73] Assignee: Bayer Aktiengesellschaft, Fed. Rep. of Germany

[21] Appl. No.: 263,028

[22] Filed: May 12, 1981

[30] Foreign Application Priority Data

May 20, 1980 [DE] Fed. Rep. of Germany ....... 3019232

[51] Int. Cl.$^3$ .......................... C08C 4/00; B29H 1/10
[52] U.S. Cl. ................................... 523/323; 264/142; 264/143; 523/324
[58] Field of Search .................... 252/182; 260/816 G; 264/142, 143

[56] References Cited

U.S. PATENT DOCUMENTS

| | | | |
|---|---|---|---|
| 3,026,273 | 3/1962 | Engles | 264/143 |
| 3,164,563 | 1/1965 | Maxwell et al. | 264/143 |
| 3,577,494 | 5/1971 | Chisholm et al. | 264/143 |
| 4,187,067 | 2/1980 | Mizuno et al. | 264/142 |
| 4,189,458 | 2/1980 | Jezl | 264/143 |

FOREIGN PATENT DOCUMENTS

1003470  9/1965  United Kingdom .

OTHER PUBLICATIONS

Journal of Powder and Bulk Solids Technology, Band 4, No. 4, 1980, published Oct.-Dec. 1980, R. Friedrich: "Powder Compression with Co-Rotating Twin-Screw Extruders", pp. 27-32.

Primary Examiner—Benjamin R. Padgett
Assistant Examiner—Matthew A. Thexton
Attorney, Agent, or Firm—Connolly and Hutz

[57] ABSTRACT

Granulate-form agglomerates of pulverulent rubber chemicals having a maximum primary grain size of 500 μm, an active substance content of at least 90% by weight and an assessment (a) in the intermixing test of at the most 1.5, (b) in the dust proportion test of at the most 10, (c) in the fine material proportion test of at the most 5 and (d) in the falling test of at the most 70, as well as a process for its production characterized in that the pulverulent rubber chemicals of a maximum primary grain size of 500 μm are mixed with a moistening agent and/or a lubricant and are supplied to a double shaft screw granulator with forced conveyance, in which the spacing between the nozzle plate and the vertically cut screw ends is between 0 and 1.6 mm, whereby the compression ratio $K_D$ is between 1:6 and 1:1.5 and the ratio of nozzle channel length to nozzle channel diameter is between 1 and 6, and whereby the specific granulation work is from 2 to 40 Wh/kg, the rubber chemicals are forced axially through a nozzle perforating plate, the issuing strands are severed or are allowed to break-off and are then dried.

6 Claims, 16 Drawing Figures

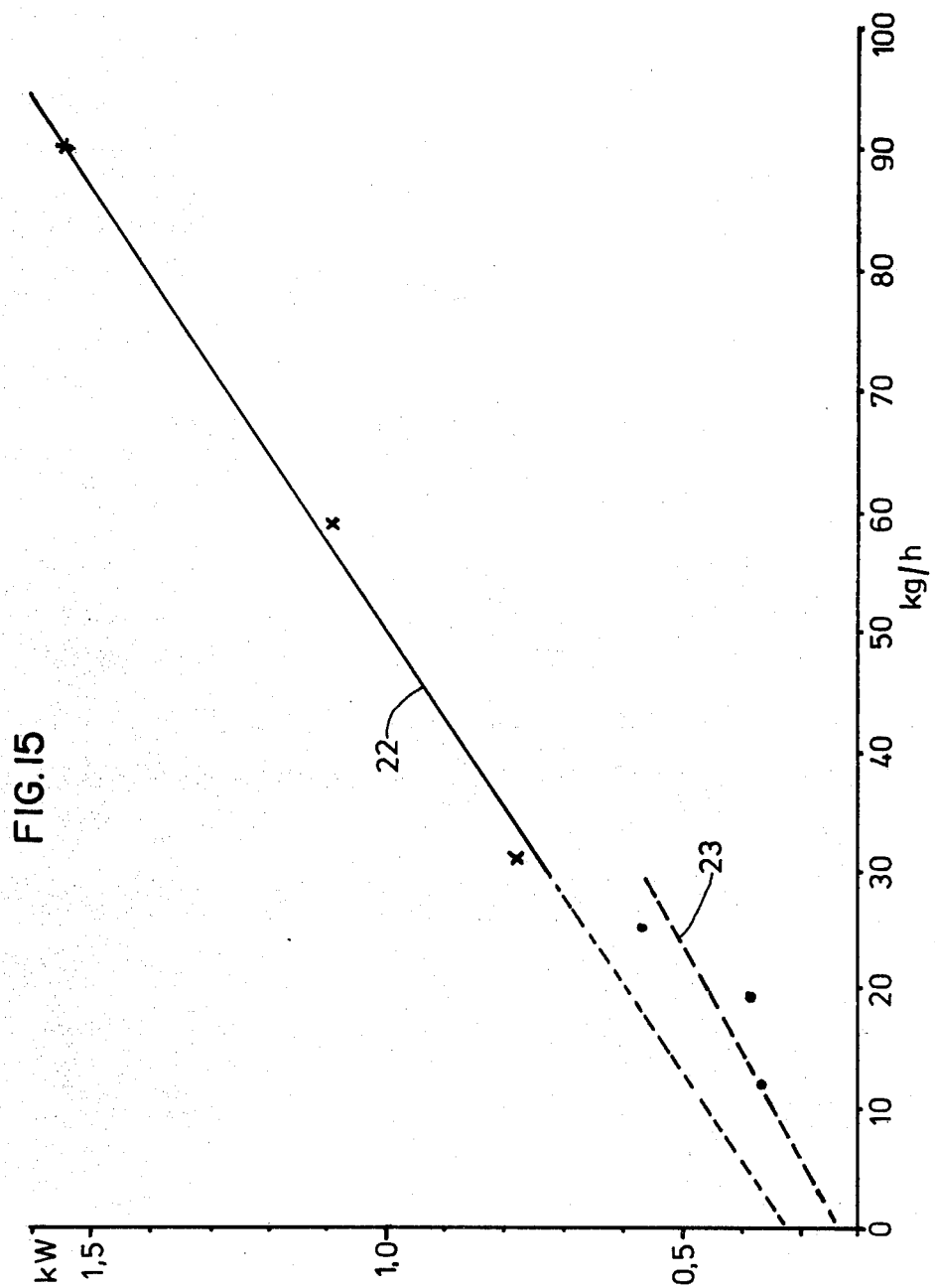

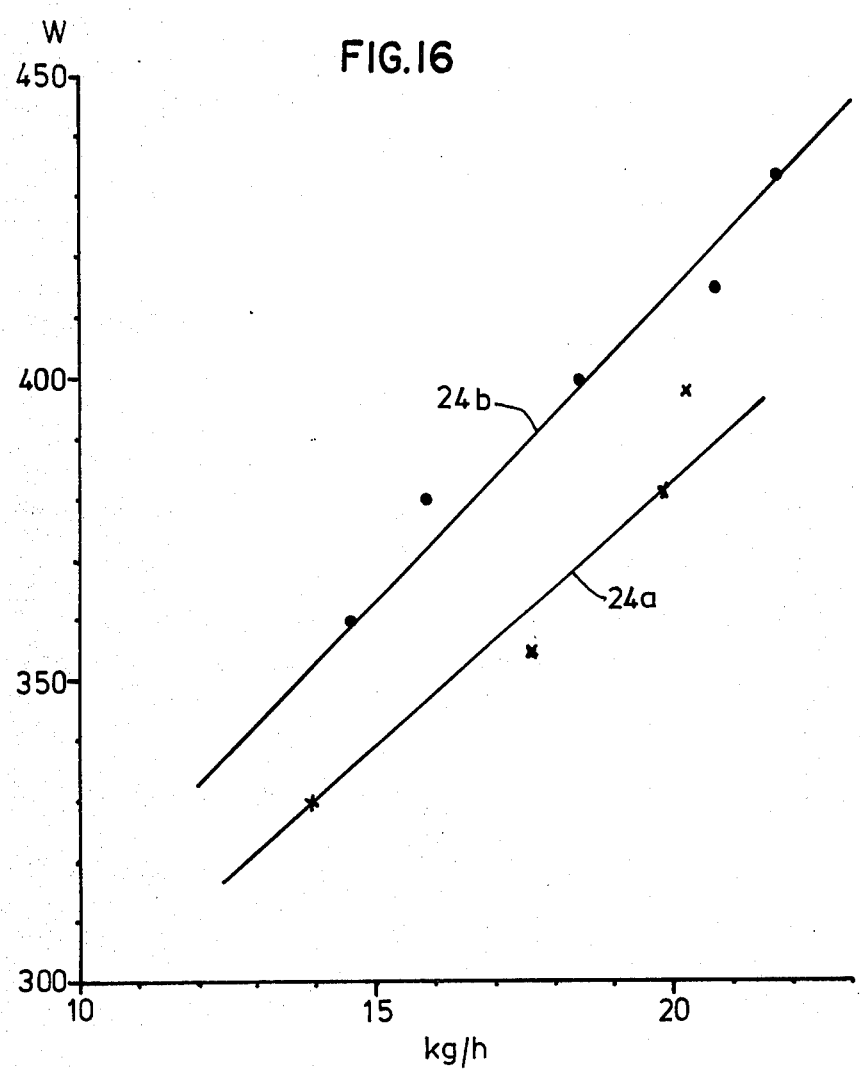

GRANULATE-FORM POWDER AGGLOMERATES OF PULVERULENT RUBBER CHEMICALS AND A PROCESS FOR PRODUCTION

The present invention relates to granulate-form agglomerates of pulverulent rubber chemicals, called for short, granules or granulates, and to the production thereof using double shaft screw granulators.

Rubber chemicals with melting points below 90° C. are preferably produced in yield forms (e.g. lumpy granulates, flakes, tablets etc.) obtained from the melt. Those with melting points above 90° C. are present as pure or oiled powders, also as granulates with diameters greater than or equal to 6 mm or also as a micro-granulate with a diameter smaller than or equal to 1 mm, as produced in the known spray drying technology.

Seen generally, the granulate synthesis technique, the compression agglomeration technique or the drying agglomeration technique are provided for agglomerating pulverulent substances.

Thus, for example, for the granulate synthesis technique, roll granulation is employed by means of a plate, drum, cone, belt or by vibration, granulation by mixing using a plate mixer, mixing drum or screw mixer, fluidized bed granulation and granulation in liquids.

The best known representative apparatus for the drying agglomeration technique is the spray dryer. The apparatus which may be obtained on the market for carrying out these agglomeration techniques are compiled in detail in a survey publication in the Zeitschrift Aufbereitungstechnik (No. 3 (1970), page 147 ff).

The process for the granulate synthesis and drying granulation techniques produced system-inherent spherical granulates with a wide grain size spectrum, so that they have a relatively large portion of recycled product. Moreover, in the case of substances whch risk dust explosion, they have the disadvantage that special precautions have to be taken to prevent dust explosions. Apart from the expense, disadvantages with respect to quality (for example, in the case of selt inert-rendering spray dryers, by recycling cracked products) may also be associated with it. The compression agglomeration technique is recommened for the final formulation of pulverulent substances for the reasons mentioned. The compacting technology using compacting presses and briquette presses must also be classed with it as must the perforated press process. If rubber chemicals are agglomerated using the compacting and briquetting technology, then such solid granules are obtained which fail in the intermixing test which is described later on. This means that any successful agglomeration technique for rubber chemicals must operate in a compressive force range such that no heat-reducing sintering of the primary grains occurs also in the microscopic range.

In principle, this only succeeds with the known processes and apparatus which are based on the screw extruder principle (e.g. Industriewolf belonging to Alexander Werke, Extruktor belonging to Rietz) when the products to be agglomerated are relatively highly porous and agglomerates with diameters larger than 4 mm are to be produced. However, these single shaft screw machines fail when relatively dry powder is to be produced having granules with a small diameter (from 1 to 4 mm) with only smaller binder additives. One reason for their failure is the inadequate drawing in power of single shaft screw machines for powders when coveying against pressure. If the powder to be granulated is adjusted to be more pasty using liquids or binders, then there is mostly a very narrow range within which the product may be extruded. However, an adequate operational reliability is not ensured due to the narrow tolerance limits to be observed. Also, the physical characteristics required for rubber chemical granulates such as intermixability, proportion of dust, granulate stability or pourability cannot be set with sufficient reliability.

In order to obtain a reasonable ratio of machine volume to throughput, the extruding process must have as large a number of nozzle bores per nozzle plate as possible. It may apply as a rule of thumb that the smaller the strand diameter, the larger the number of nozzle bores per plate must be. This means that many of the bores positioned on the circumference of the nozzle plate must inevitably be superimposed. If the product has been adjusted to be too pasty, then it issues from the nozzle bores in the form of "spaghetti", and in an extreme case, even as a continuous strand. Both strand forms are naturally very soft, the extrusion bonds together so that no distinct granules may be obtained. Even a cutting device, for example a rotating knife does not provide any advantages. Since the strands tend to smear on the severing surfaces, this, however, results in considerable deformations and an increased sticking of the granules.

Therefore, according to the prior art, for the production of quantities of mono-disperse diameter granules of rubber chemicals, only the so-called briquette compacting presses and some perforating presses (e.g. toothed wheel perforating rolls) have hitherto been suitable, but not the known screw extruders.

Granules of rubber chemicals have to fulfil a number of physical and chemical characteristics in order to be able to be used properly in practice. The following are mentioned by way of example, as the most important of these characteristics:

(a) as high a content of active material as possible which may be guaranteed by specifications such as content analyses, residue on ignition, insoluble portions in diverse solvents or spectroscopic methods;

(b) outstanding intermixability in rubber sheets;

(c) as small a proportion of dust as possible (from the work hygiene point of view);

(d) a small proportion of fine material in the granulate which has just been extruded;

(e) an effective stability of the granules which have to endure the packing process, transport and conveying procedures right up to the processing station without disturbing decomposition.

(f) an effective pourability for simple metering when draining-off and processing.

In many cases, a dustfree granulate form is a prerequisite for a financially favourable drying process which may be controlled with regard to safety (danger of dust explosion).

None of the hitherto known rubber chemical granulates has the described characteristics profile. Such a characteristics profile cannot be obtained for rubber chemical granulates using the briquetting and perforating presses further described above; the combination of a good intermixability on the one hand a high granulate stability on the other being particularly problematic in this case. Granulates produced by means of briquetting or perforating presses are frequently sintered together on the surface and are thus much too hard. The classes which were previously described and substantially determine the characteristics of rubber chemicals are defined metrologically in the following.

(a) determining the content of active material in rubber chemicals is a problem of organic or inorganic-chemical analysis, depending on the type of substance, and is known for the most part in the literature. Moreover, there are often specific agreements between the manufacturer and the client concerning the specifications in particular, so that no specific details may be given here.

(b) the intermixing test (IMT value) is assessed by an experiment with a subsequent visual assessment of the distribution. In accordance with production processing, a natural rubber (deformation hardness 1000) is drawn out into a roller sheet in a pair of friction rollers heated to from 40° to 50° C. 10% thereof, based on the total mixture of the rubber chemicals to be tested is introduced into the roller gap and there is a waiting time until it has been distributed over the rolled sheet, this waiting time depends, for example, on the coarse structure of the chemicals, the temperature of the rolled sheet being increased by the mechanical frictional stress to approximately 80° C. The mixing process is completed by plunging and turning the rolled sheet six times, and the sheet is rolled out in rolls. The total mixing process lasts for approximately 3 to 4 minutes. The rolls are now cut at several points and the cut surface is assessed visually. Assessment is made on a scale from 0 to 3 defined as follows:
0: no visible specks
0.5: just visible small specks
1: a few small specks
1.5: many small or some larger specks
2: large specks
3: large thick specks An optimum IMT value is 0, an IMT value of 1.5 is still tolerable.

(c) the proportion of dust is determined in a dust measuring device according to Cassella. In this test, 10 g of granulate is dropped from a height of 70 cm through a pipe of 5.5 cm inside diameter into a cubic black metal container and the extinction of a beam of light extending transversely to the falling direction is measured (scale of from 0 to 100%). The dust number is the sum of the maximum extinction which is caused by the whirled-up dust immediately after the material has fallen, plus the extinction which still remains after 30 seconds. By practical experience, the "dust number" 10 is established as a limit for micro-granulates, and desirable granulates should have a dust number of less then 5.

(d) in order to determine the portion of fine material, approximately 500 g of moist granulate are removed directly at the nozzle openings using a drying plate. The product is dried under vacuum at 50° C. and is then sieved with gentle shaking through a standard sieve with a 1 mm mesh. The proportion which is sieved through, expressed as a percentage, is designated as the fine material portion of the granulate. This proportion should be less than 5%, and as far as possible less than 3%.

(e) the granulate stability is established in the falling test. 100 g of the sieved granulate residue from the assessment of the fine material portion is dropped from a height of 1 m, 100 times in a 250 ml round flask made of plastics material. The proportion of fine material is again determined, as described under (d), on a 1 mm-standard sieve. The quantity in grams which is sieved through is used in the form of a non-dimensional number as a measurement of the granulate stability. A stability value of 70 applies as an upper limit for adequately stable granulates, values below 50 are preferred and very stable granulates attain stability values of below 30.

All hitherto known granulate forms only partly fulfil the characteristics profile defined according to the requirements of processing practice. Spray-dried micro-granulates only just pass the dust value test and therefore may often be processed only by taking particular work-hygiene precautions. Micro-granulates with diameters larger than 6 mm require a protracted drying process. They are only intermixable with comparatively long mixing times, because the large granules are only drawn in with difficulty by the processing rollers. This stipulates longer processing times or a poor intermixing of the rubber chemicals.

The granulate diameter range considered as an optimum from the point of view of usefulness is from 1 to 6 mm, preferably up to 4 mm. Granulates of this size which have a thoroughly satisfactory characteristics profile have not hitherto been accessible. Only screw extruding machines appear to be suitable devices for their production. As already stated, single shaft screw machines are not very suitable for granulation. A double shaft screw powder granulating machine belonging to the Japanese firm Fuji Paudal did not provide good results either. In this type of machine, the compressed powder is extruded through nozzle holes, optionally radially or axially, and also the moist material must be regulated before granulation by kneading, for example, with friction roller kneaders so that it is capable of sliding. The granulate obtained with this machine has only an unsatisfactory stability (stability value in the falling test: >70) and a high proportion of fine material. In an experiment to set a higher powder compression, the throughput quantity of the machine fell rapidly and a well formed granulate was no longer obtained.

Surprisingly, it has now been found that granulates of rubber chemicals corresponding to the characteristics profile previously described, may be obtained by extruding moist rubber chemical powders which are regulated so that they are able to slide by adding a moistening agent and/or lubricants, through a nozzle plate in a double shaft extruder using specific granulation energies of from 2 to 40 Wh/kg.

Therefore, the present invention relates to granulate-form, non-dusting agglomerates of pulverulent rubber chemicals which have a maximum primary grain size of 500 μm, preferably of a maximum of 300 μm, and an active material content of at least 90% by weight, preferably of at least 95% by weight, and which achieve an assessment in the intermixing test of at the most 1.5, preferably, in the range of from 0 to 1; in the dust proportion test of at the most 10, preferably at the most 5; in the fine material proportion test of at the most 5, preferably at the most 3, and in the falling test of at the most 70, preferably at the most 50.

For the production of granulate-form agglomerates according to the present invention a double shaft screw granulator is used with forced conveyance, in which the spacing between the nozzle plate and the vertically cut screw end is between 0 and 1.6, preferably between 0.1 and 1.0 mm, whereby the compression ratio $K_K$ is between 1:6 and 1:1.5 and preferably between 1:4.5 and 1:2.5, and the ratio of nozzle channel length to diameter is between 1 and 6, preferably between 2 and 5 and specific granulation work of from 2 to 40, preferably from 5 to 30 Wh/kg are applied.

The granulate is forced axially through a nozzle perforated plate at the ends of the screw, the issuing strands are severed at the required length or they are left ot break-off under their own weight. The characteristics of the granulates are determined after drying.

A mechanical pre-treatment of the moist powder before granulation is not necessary. The moistening agent required to adjust an adequate sliding capability, or the optionally required lubricant is admixed with the moist powder in a commercially-conventional mixer. Naturally, the components may also be intermixed in the granulation extruder; in this case, it is appropriate to provide the screw shafts with mixing elements to improve homogenisation.

The moist portion of the powder to be regulated is between 5 and 50%, by weight, preferably between 10 and 40% by weight, based on the total mixture, depending on the respective substrate; the proportion of lubricant amounts to from 0 to 5% by weight, preferably from 0 to 2% by weight, based on the solid substance portion.

The quantity of the moistening agent and of the lubricant required depends on the sliding property of the powder to be regulated; this is selected so that for the shaping process, a specific energy of from 2 to 40, preferably from 5 to 30 Wh/kg is available. Since the sliding property of the dry powder essentially depends on the crystal structure and on the primary grain size of the respective substrate, a generally valid moisture and lubricant content may not be specified. It is completely possible to granulate dry powders in the presence of just lubricants. In like manner, the addition of lubricants may be omitted and the moist material may be granulated in the presence only of water without further additives. Instead of water, other wetting, non-dissolving liquids may also be used for the production of a boundary surface film which reduces friction, as, for example, alcohols, toluene, chlorobenzene, dioxan or aliphatic chloro-hydrocarbons. However, water is the preferred medium for moistening, because rubber chemicals are produced predominantly in aqueous systems.

Moreover, the granulate form of from 1 to 6 mm diameter for the rubber chemicals constitutes an optimum readymade form for most drying processes. Finer agglomerates of powders tend to form dust with all the associated safety and work-hygiene risks, and larger granulates require longer drying times.

The task of the lubricant is to reduce the friction between the individual crystals by forming a boundary surface film. Products with a small average primary grain size generally require a small quantity of lubricant. Where the grain becomes increasingly coarser, then more lubricant must also be used. Depending on the nozzle hole size, a compacting of rubber chemicals up to an average grain size of 500 $\mu$m may be effected, but the quantity of lubricant must then amount to 5% by weight, preferably up to 3% by weight. The average lower grain size is not restricted. However, it is restricted in practive since the product must provide an adequate filterability. Very fine-grained rubber auxiliary agents (average primary grain size below 5 $\mu$m) retain a lot of water in the filter cake. This quantity of powder moisture is often too large for the granulation procedure described, the material cannot be adequately compacted. In such cases, a pre-dehydration is required in an additional step of the process or the remixing of moist and already dried powder is required. Therefore, a granulation of rubber chemicals is possible in the average primary grain size range of between 0.1 and 500 $\mu$m, while the range of between 5 and 300 $\mu$m is preferred.

Coarser grained crystalline substances may be crushed by grinding to the optimum grain size required for granulation. The same effect is produced by a kneading process on the moist, coarse grained material. Kneading may be carried out in commercially-conventional machines, on a pair of rollers optionally operating with friction or on kneading elements also installed in the granulation extruder. In most cases, such a kneading effect is disadvantageous for fine-grained rubber chemicals with primary grain sizes of below approximately 30 $\mu$m. Such products are produced, as already stated with a high filter residual moisture and during the kneading procedure, thixotropic phenomena often occur or less often, dehydration phenomena. In the first case, the material becomes so slidable that an adequate specific granulation energy cannot be applied. In the second case, the granulation work becomes too large, the product is compacted too much, and the machine may possibly come to a standstill. It is an advantage of the granulation process described that a kneading or plasticising step may be omitted in the product pre-treatment. In this manner, it is possible to carry out granulation even with fine-grained materials without a thermal pre-drying which is difficult to effect with regard to processing. A pre-plasticising step only provides advantages when a moist powder is present with very slight residual moisture, which is to be directly granulated without a moistening addition. However, this case does not occur in practice, the residual moistures to be achieved on conventional filtration devices only allow granulation without pre-plasticising.

Suitable lubricants belong to the most varied classes of compounds. They must be chemically inert to the respective rubber aids. The utility and vulcanisation characteristics of the auxiliary agents should be influenced as little as possible by their use. For example, lubricants should not be greatly hygroscopic and should only contain a small amount of metal cations. For this reason, sulphatized emulsifiers, for example, are not very suitable as lubricants. Preferred lubricants for the production of the powder agglomerates according to the invention are the following, among others: mineral oils and waxes such as paraffin wax or Carnauba wax; polyethers such as polypropylene glycols or polybutane diols; polyesters, for example, Desmophene 800, and polyvinyl alcohol and silicon fluids. Lubricants which are particularly preferred are ethoxylated and/or propoxylated phenols or aliphatic alcohols or fatty acids, for example triethylene glycol mono lauryl ether, pentaethylene glycol mono lauryl ether, octaethylene glycol mono stearyl ether, tetraethylene glycol monononylether, hexaethylene glycol monononyl phenyl ether, hexaethylene glycol monostearate, octaethylene glycol monooleate, octadecaethylene glycol monooleate, dodecaethylene glycol distearate, addition products of ethylene oxide and/or propylene oxide to sugar or addition products of propylene oxide to coconut oil in emulsion with water. The following compounds, for example, are well suited as lubricants, but are not preferred due to their salt content: oleic acid-N-methyl tauride, maleic acid oxyethane sulphate, alkyl sulphonates or alkyl sulphates.

The specific granulation work $A_{spec.}$ is the mechanical energy to be used for granulating 1 kg of moist powder. If, for example, the electrical power consumption of the granulating machine drive is entered on a diagram in Watts versus the corresponding throughput power (dimensions: kg/h), then the specific granulation work at a specific throughput is obtained as the curve gradient at the relevant point. In the preferred working range for the production of the granules according to the invention, the dependence is linear, the specific granulation work is therefore constant:

$$N_{electr.} = A_{spec.} \cdot D + A_o$$

$N_{electr.}$ = electrical power consumption of the granulator
$A_{spec.}$ = specific granulation work
$D$ = throughput power of the granulator
$A_o$ = ordinate intersection in the diagram, corresponds to the point of zero work without conveying capacity.

For each product there is a range of the specific granulation, within which optimum granulate characteristics are obtained. This range varies in width and absolute size due to the varying crystal structure, crystal hardness, primary crystal size and the unavoidable impurities in the product which are conditioned by synthesis. Regulating the sliding property of the moist powder by, for example, water and/or the addition of lubricants allows the granulation process to be carried out within the optimum range of the specific granulation work.

If the machine throughput is considerably increased, then an above proportional increase in the electrical power consumption is often observed due to the mechanical forcing out of water, the granulation conditions may then no longer be maintained constant over a longer period of time. This effect generally occurs in the average grain size range above approximately 20 μm. In the case of smaller primary grain diameters, the opposite effect is occasionally observed: the material becomes more flowable, it exhibits thixotropic characteristics. The extruded material is then sticky and is not pourable when moist. The individual granulate strands do not therefore break up under their own weight, but instead they stick together firmly and form lumps. The appearance is similar to using material which contains too much moisture and/or too much lubricant or to granulating with a previous kneading or plasticising of the moist material. However, the product may still be easily metered into the granulator which is not readily possible when the powder is too moist.

The rubber chemicals to be granulated belong to various chemical substance classes. The following products may be advantageously converted into the granulate form according to the invention.

2-mercaptobenzthiazol- and the derivatives thereof such as zinc-2-mercaptobenzthiazol or dibenzthiazolyldisulphide;

sulphenamides of 2-mercaptobenzthiazol such as benzthiazolyl-N-cyclohexylsulphenamide, benzthiazolyl-N-dicyclohexylsulphenamide, benzthiazolyl-N-t-butylsulphenamide; benzthiazolyl-N-morpholinylsulphenamide;

guanidine derivatives, e.g. N,N'-diphenylguanidine, N,N'-di-o-tolylguanidine or o-tolyldiguanide;

thiourea derivatives such as 2-thionoimidazolidine;

benzimidazol and the derivatives thereof such as methylbenzimidazol, 2-mercaptobenzimidazol or 4- or 5-methyl-2-mercaptobenzimidazol, zinc-mercaptobenzimidazol;

zinc salts of dithiocarbamic acid such as zinc-N,N-dimethyldithiocarbamate, zinc-N,N-diethyldithiocarbamate, zinc-N,N-dibutyldithiocarbamate, zinc-N-ethylphenyldithiocarbamate, zinc-N-pentamethylenedithiocarbamate, or the double salt from zinc-N-ethylphenyldithiocarbamate and cyclohexylethylamine;

disulphides such as tetramethylthiuramidisulphide, N,N'-di-methyl-N,N'-diphenylthiuramdisulphide, dibenzothiazolyl-disulphide or S-benzthiazolyl-S'-morpholinyldisulphide;

monosulphides such as tetramethylthiurammonosulphide;

aromatic amines such as N-isopropyl-N'-phenyl-p-phenylendiamine, phenyl-β-naphthylamine, N-hexyl-N'-phenyl-p-phenyldiamine;

phenol derivatives such as 2,2'-methylene-bis-(4-methyl-6-tert.-butylphenol) 2,2'-methylene-bis-(4-methyl-6-cyclohexylphenol), 2-morpholino-3-spiro-3'-methylcyclohexene(3'-yl)-5-hydroxicoumarane, pentachlorothiophenol-zinc salt;

derivatives of tetrahydrobenzaldehyde such as pentaery-thrite-bis-tetrahydrobenzaldehydacetal;

inorganic fillers such as zinc oxide, silicic acid and silicates, carbon black;

carboxylic acids and the derivatives thereof e.g. benzoic acid, phthalic acid anhydride, zinc stearate, stearic acid;

propellants separating nitrogen such as benzene sulphohydrazide, toluene sulphohydrazide, benzene disulphohydrazide, azodicarbonamide, diphenylether-4-4'-disulphonic acid dihydrazide, and mixtures of such substances with stabilising agents;

sulphur.

Mixtures of these chemicals with each other and with other substances may also be processed into the granulates according to the invention.

Double shaft screw extruders rotating in the same direction or in an opposite direction may be used as machines for the production of the granulates according to the invention. The length of the screws should not exceed ten times their diameter in an opposite rotational direction (H/D-ratio 10), a 1/D- ratio $\leq 6$ is preferred.

The screw shafts should have a positive extrusion characteristic. This is understood to mean that the ends of the screw which convey the material for extrusion towards the nozzle plate should have at least the same conveying capacity as the screw segments in the drawing-in region. In the case of single-thread screw shafts, the extrusion power may be increased by particular multiserrated stripping caps on the screw end and thus the granulate throughput quantity may be increased. The screw shafts should not have a compression or kneading zone. In order to achieve as favourable a drawing-in behaviour as possible, the screw ridges should be designed to be as narrow as possible in relation to the pitch.

The gap between the screw end and nozzle plate should be a maximum of 1.6 mm, preferably a maximum of 1.0 mm wide. It is shown in Examples 15 to 17 how the width of this gap influences the specific granulation work. Accordingly, in the case of a gap width greater than 1.6 mm, it is only possible with moist powder which has been adjusted to be extremely slidable to achieve specific granulation work of less than 30 Wh/kg. However, such powder regulation leads to the extrusion of spaghetti-shaped strands which stick together easily. In general, as small a gap width as possible is the optimum, because work may then be carried out in the region of the greatest operation safety, see FIG. 10. For this reason, the screw ends should be designed to extend flat and plane-parallel to the nozzle plate and not acutely or conically. The nozzle bores are advantageously positioned in the form of concentric circles in the region which is swept over by the screw path. According to the direction of rotation, conveying characteristic and number of paths of the screw shafts, the mutual spacing of the individual bores on the plate surface may vary in size. The ratio from the total of the nozzle bore surfaces to the free screw cross-section is defined as the compression ratio. It is an important parameter for adjusting the required specific granulation work.

The nozzle bores are preferably designed cylindrically. If the bores are conically sunk in on the screw side, then a considerable increase in the specific granulation work results. However, a conical sinking positioned on the outside has no influence but occasionally causes surface rougheniengs in the extruded strands.

BRIEF DESCRIPTION OF THE DRAWINGS

Novel features and advantages of the present invention in addition to those mentioned above will become apparent from a reading of the detailed description in conjunction with the accompanying drawing wherein:

FIG. 15 is a plot similar to FIG. 2 for Examples 22 and 23; and

FIG. 16 is a plot similar to FIG. 2 for Examples 24a and b.

The following machines were used for experiments:

MACHINE 1

Figure 1:
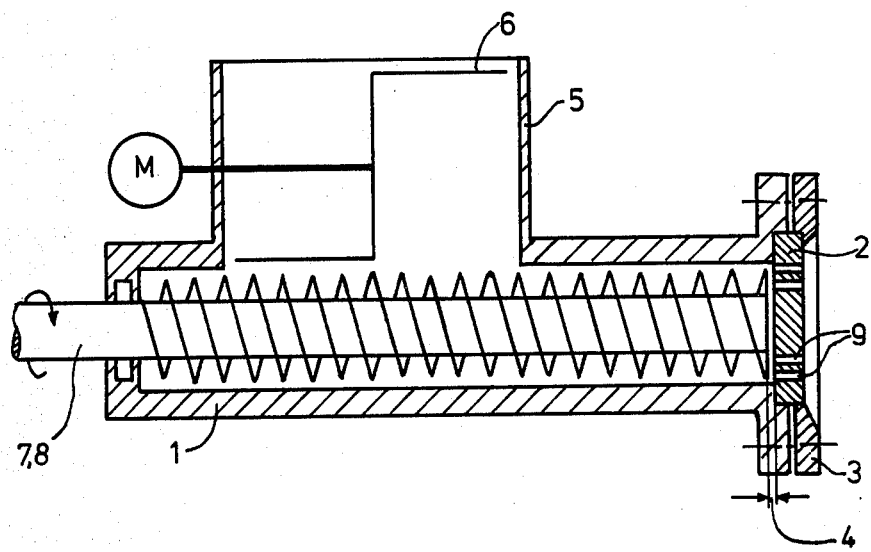
FIG. 1 is a diagrammatic cross-sectional view of a granulation screw conveyor.

FIG. 1 of the drawing illustrates a diagram of a granulation screw extruder with shafts rotating in the same direction (diameter 35 mm) with a screw profile in a combing position. This is a double-thread cut pair of screws and the two shafts may be positioned vertically or horizontally to each other. In the illustration, one screw is shown with adjacent shafts, but a machine with superimposed shafts was used in the experiments described in the following. The 1/D-ratio is 5.5, the spacing of the screw ridges from the cylinder is approximately 1 mm and the gap width between the smoothly cut screw ends and the nozzle is 0.2 mm, if not stated otherwise. There is an agitation wheel in the drawing-in funnel, which wheel is responsible for a good filling of the screw paths with the moist powder. The machine is driven via an electromotor and a mechanical regulating gear via a sliding clutch; the electrical power consumption of the motor may be registered by a recorder. The nozzle plate i exchangeable and is attached to the cylinder by a coupling nut, the screw ends are not mounted.

The reference numbers specified in FIG. 1 represent the following:
1 = Cylinder
2 = Nozzle plate
3 = Nozzle head plate
4 = Gap between screw head and nozzle plate
5 = Filling funnel
6 = Agitation wheel
7,8 = Screw shafts, double thread combing
9 = Nozzle channel bore The following nozzle plates were used:

TABLE I

| Nozzle No. | Bore diameter (m) | Plate thickness (mm) | No. of bores per plate | $K_D$ | Bore sunk in |
|---|---|---|---|---|---|
| 1.1 | 2.0 | 4.0 | 74 | 1:4.1 | no |
| 1.2 | 2.0 | 4.0 | 106 | 1:2.9 | no |
| 1.3 | 2.0 | 7.0 | 106 | 1:2.9 | 3 mm, 60° |
| 1.4 | 2.5 | 7.0 | 74 | 1:3.3 | 3 mm, 60° |
| 1.5 | 2.5 | 7.0 | 106 | 1:2.2 | 3 mm, 60° |

MACHINE 2

This machine corresponds in construction and design to machine 1, but it has a screw diameter of 70 mm, 1/D-ratio=9.5

The following nozzle plates were used:

TABLE II

| Nozzle No. | Bore diameter (m) | Plate thickness (mm) | No. of bores per plate | $K_D$ | Bore sunk in |
|---|---|---|---|---|---|
| 2.1 | 2.0 | 6 | 491 | 3.36 | no |

MACHINE 3

Machine 3 corresponds in construction to machine 1 with the following parameters:

| | |
|---|---|
| Direction of rotation | opposite |
| No. of screw paths | one per shaft |
| Screw diamater | 140 mm |
| Screw length | 280 mm |

-continued

| | |
|---|---|
| l/D-ratio | 2:1 |
| Position of the shafts | horizontal |
| Spacing of ridge from cylinder | 2 mm |
| Spacing of screw end from nozzle plate | 0.5 mm |

Filling the granulating machine via a metering screw with a controllable drive.

A three-blade stripping element apiece was mounted sunk-in on the screw ends. Each stripping blade presses the moist powder into the nozzle bores so that a large etrusion yield results.

| | |
|---|---|
| No. of bores | 1839 |
| Diameter of the bores | 2 mm |
| Plate thickness | 10 mm |
| Compression ratio $K_D$ | 3.2 |
| Type of bore | cylindrical |

SUBSTRATES USED AND SETTING THE SLIDING PROPERTY

All the rubber chemicals used in the following granulation Examples were removed from the large-scale production before the drying process as moist material free of additives. The moist materials isolated on commercial filter devices (for example, suction filters, filter presses, band filters, rotary filters) or centrifuges had residual water contents which were slightly lower than were later found to be optimum for the granulation process.

In order to intermix the necessary quantities of lubricant and optionally additional water, two paths were taken:

In the mashing process, the filtered moist material removed from production is mashed to approximately 30% in water, the lubricant is added in the required quantity (based on solid substance) and is homogenously distributed by stirring. In a second filtration or centrifuging step, the product is adjusted to the required residual moisture. The quantity of lubricant remaining in the moist powder can only be analysed approximately and with difficulty, it should be between 50 and 95% of the quantity used.

In the mixing process, the filtered moist material removed from production is mixed with the quantity of water also required and the required quantity of respective lubricant and is homogenised in commercially conventional mixers, for example asymmetric moved mixers, ploughshare mixers, paddle mixers, screw mixers or Nauta mixers.

The moist powders produced in this manner may be used for granulation without additional processing steps such as, for example, milling or kneading. Such an additional kneading procedure is possibly disadvantageous for fine-grained rubber chemicals, as already stated above, as dehydration or thixotropic phenomena may occur. In such cases, a specific granulation work corresponding to the process of the invention may not be set and the optimum granulate characteristics may not then be achieved.

Rubber chemicals specified in the following Table III were used by way of example for the granulation experiments.

TABLE III

| Rubber chemicals | Abbreviation | Average primary grain size (μm) | Intermixing test of the powder (IMT) | MP (°C.) | Content (°C.) |
|---|---|---|---|---|---|
| Dibenzothiazolyldisulphide | MBTS | 20 tends towards agglomeration formation | 1 | 167–72 | 94.6 |
| S—benthiazolyl-S'—morpholinyldisulphide | Vulkuren-2 | 18 | 0.5 | 130 | 96.5 |
| 2-mercaptobenzthiazol | MBT | 7 | 0–0.5 | 176–182 | 98.4 |
| Benzthiazolyl-N—cyclohexylsulphenamide | CZ | 40 | 1 | 103 | 95.9 |
| Benzthiazolyl-N—t-butylsulphenamide | NZ | 190 | 1 | 107–110 | 90.6–92.6 |
| N,N'—diphenylguanidine | D | 20 tends towards agglomeration formation | 0 | 148 | 99.3 |
| Benzthiazolyl-N,N—dicyclohexalsulphenamide | DZ | 60 | 1 | 102 | 97.2 |
| Tetramethylthiuramdisulphide | TMS | 40 | 0 | 108–110 | — |

The following lubricants were used in the Experiments.

TABLE IV

| Abbreviation | Structure |
|---|---|
| L-3 | $H_{2n+1}C_n$—$(OCH_2$—$CH)_3OH$<br>n: on average 12 |
| L-5 | $H_{2n+1}C_n$—$(OCH_2$—$CH_2)_5$—OH<br>n: on average 12 |
| L-7 | $H_{2n+1}C_n$—$(OCH_2$—$CH_2)_7$—OH<br>n: on average 12 |
| NP-4 | 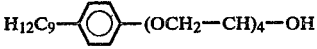 |

For each of the following Examples, the filtered moist material removed from production, as described, was regulated so as to be capable of granulation by adding lubricants according to the mixing or mashing process. This moist powder was granulated with various throughputs on the relevant granulation screw extruder. The power consumption of the driving motor was measured and entered against the respective throughput, and the corresponding diagrams for each Example are in the drawing. With an average throughput quantity, granulate samples were removed, dried under vacuum at from 50° to 60° C. on a sheet and were then examined for their characteristics. The most important experimental data are found in the following Tables.

EXAMPLES 1 TO 3

Figure 2:
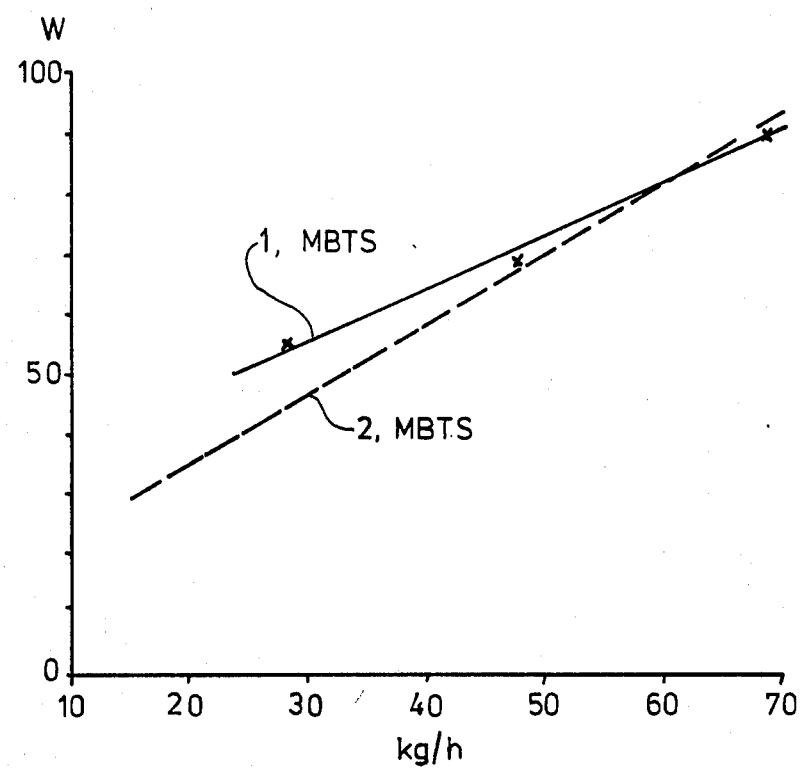
FIG. 2 is a plot of the relationship between power consumption of the driving motor and the throughput for Examples 1 and 2.
Figure 4:
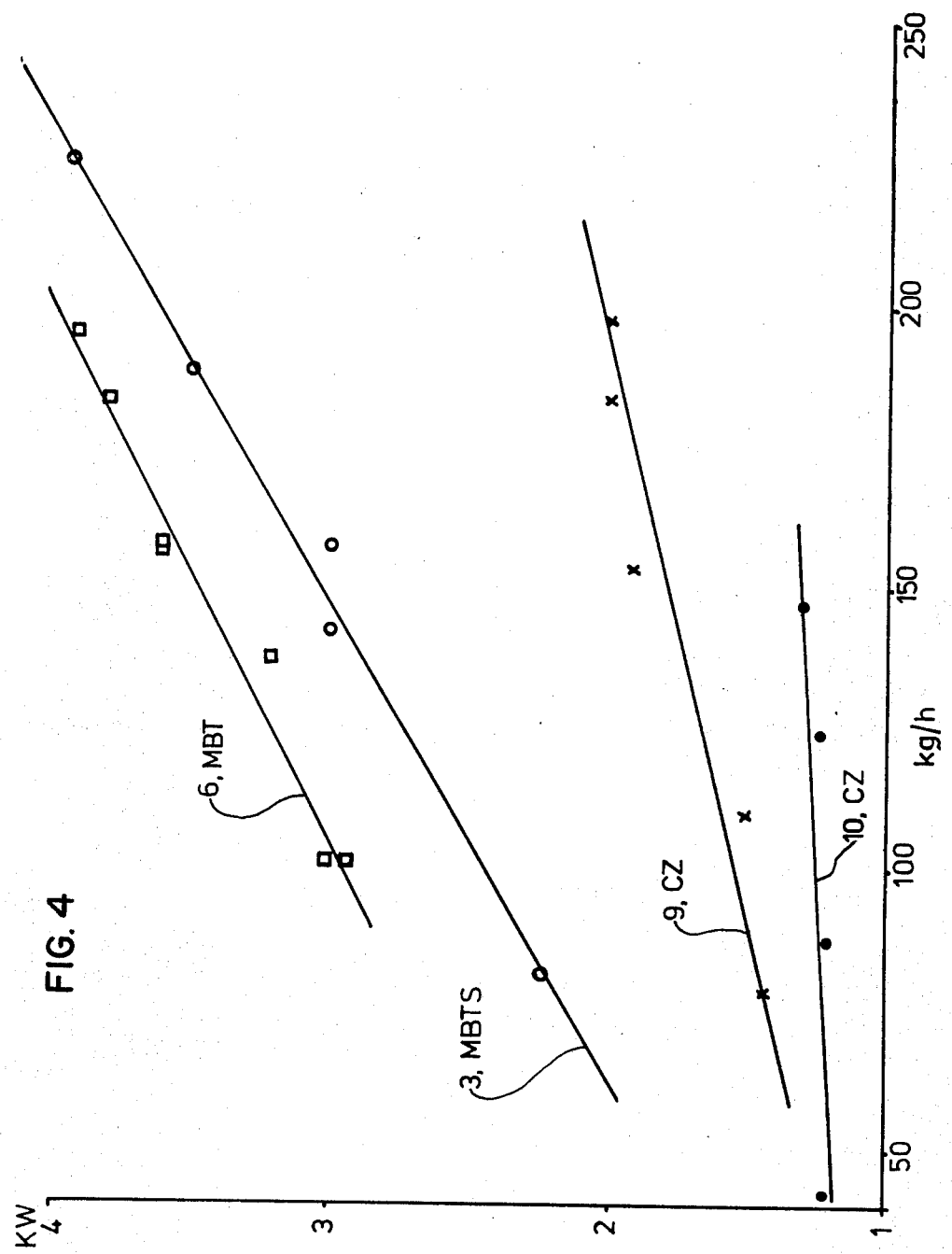
FIG. 4 is a plot similar to FIG. 2 for Examples 3, 6, 9 and 10.

Granulation of MBTS
Table V a, b; FIGS. 2 and 4

TABLE Va

Granulation of MBTS

| Example No. | Process of the sample pretreatment | Lubricant (%) | Powder moisture (%) | Granulation machine no. | Nozzle plate no. | Specific granulation work (Wh/kg) | Max through-put (kg/h) | FIG. no. |
| --- | --- | --- | --- | --- | --- | --- | --- | --- |
| 1 | mashing | 1.5 L-3 | 30.4 | 1 | 1.1 | 8.8 | 66 | 2 |
| 2 | mashing | 2.5 L-3 | 28.2 | 1 | 1.4 | 11.8 | 66 | 2 |
| 3 | mixing, Lodige mixer | 0.75 L-3 | 30.4 | 3 | 3,1 | 11.8 | 300 | 4 |

TABLE Vb

| Example No. | IMT | Proportion of fine material (%) | Granulate stability | Dust value | Mp. (°C.) | Optical assessment |
| --- | --- | --- | --- | --- | --- | --- |
| 1 | 1 | <3 | 65 | 2 | 168-72 | uniform |
| 2 | 1 | <3 | 66 | 2 | 168-72 | uniform |
| 3 | 0.5 | 2.2 | 58 | 2 | 167-72 | uniform |

EXAMPLES 4 TO 6

Figure 3:
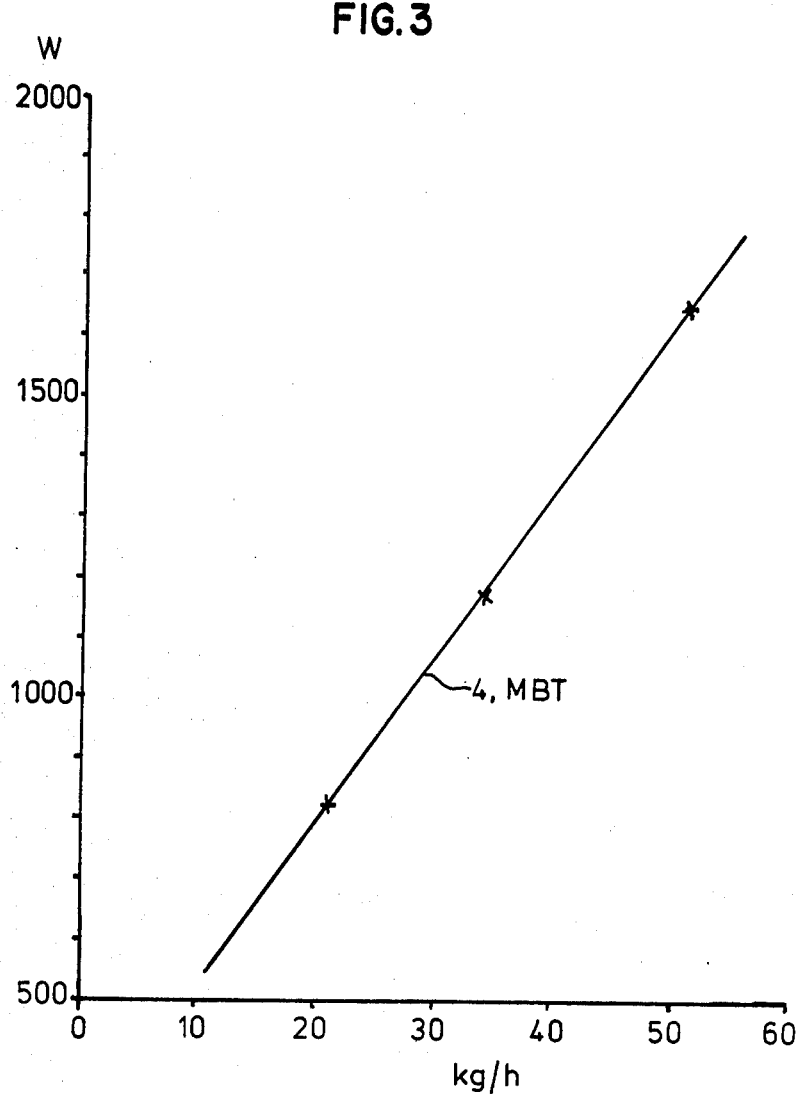
FIG. 3 is a plot similar to FIG. 2 for Example 4.
Figure 5:
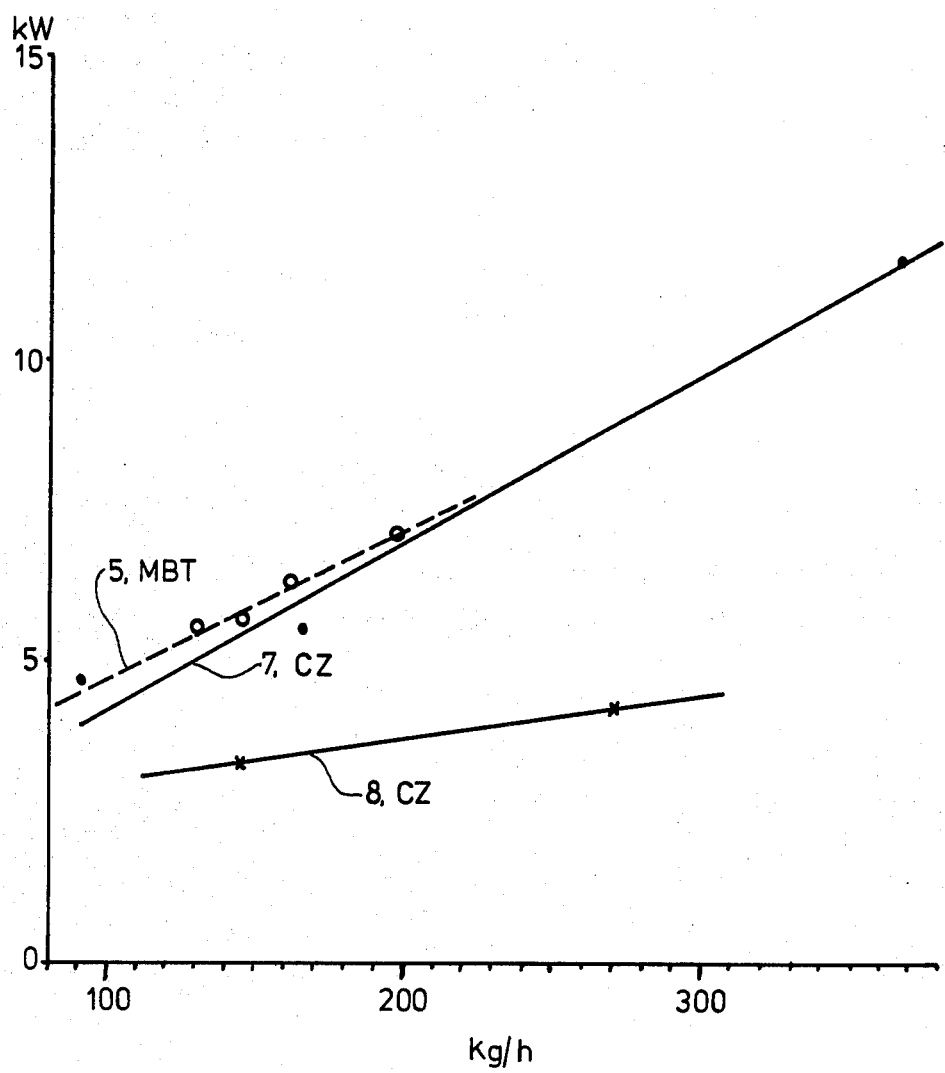
FIG. 5 is a plot similar to FIG. 2 for Examples 5, 7 and 8.
Figure 6:
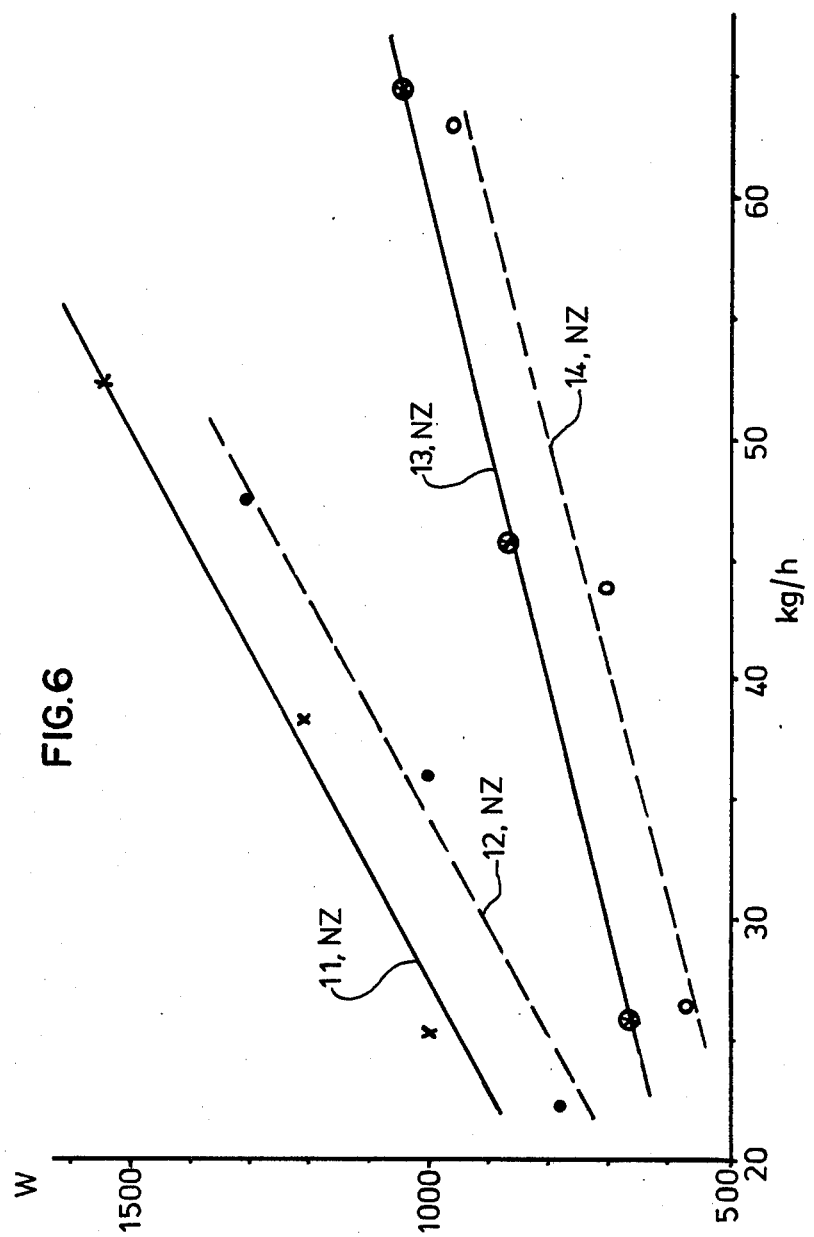
FIG. 6 is a plot similar to FIG. 2 for Examples 11, 12, 13 and 14.

Granulation of MBT
Table VI a, b
FIGS. 3, 4, 5

A comparison of Example 4 with Example 5 shows the influence of the compression ratio on the granulate characteristics. The nozzle plate 1.5 in Example 4 corresponds to a compression ratio of $K_D=2.2$. In this case, an intermixing assessment of 0.5 was obtained in spite of a high specific granulation work of 25.5 Wh/kg. The nozzle plate 3.1 corresponds to a compression ratio of 3.2, and in this case, an intermixability of 1.0 was achieved in spite of the low specific granulation work of 24.3 Wh/kg; the granulate stability has improved. If the specific granulation work is further reduced with a constant $K_D$, then outstandingly intermixable granulates are obtained, thus in Example 6. This comparison clearly shows that the adjustment of the powder slidability may not be seen as independent of the machine parameters. Instead, intervals may only be specified for both ranges, within which granulation is possible. Their own optimisation within this interval is then necessary for each product and for each machine.

EXAMPLES 7 TO 10

Granulation of CZ
Table VII a, b
FIGS. 4, 5

Example 10 is not according to the invention. The specific granulation work used for granulation is too low at 0.5 Wh/kg, so that a non-uniform granulate with an extremely high portion of the fine material of 70.3% results. Apart from this, some lumps of stuck together granulates are also present.

Examples 9 describes the granulation of the same moist powder, but with a smaller quantity of lubricant. The resulting specific granulation work of 4.8 Wh/kg falls in the range according to the invention, the resulting granulate characteristics are desirable.

TABLE VIa

Granulation of MBT

| Example No. | Type of sample pre-treatment | Lubricant (%) | Powder moisture | Nozzle No. | Machine No. | Specific granulation work (Wh/kg) | Max through-put (kg/h) | FIG. no. |
| --- | --- | --- | --- | --- | --- | --- | --- | --- |
| 4 | mashing | 2.5 L-3 | 26.4 | 1.5 | 1 | 27.5 | 60 | 3 |
| 5 | mixing | without | 30.7 | 3.1 | 3 | 24.3 | 200 | 5 |
| 6 | mixing | 0.5 L-5 | 30.4 | 3.1 | 3 | 10.5 | 100 | 4 |

TABLE VIb

Granulation characteristics of MBT

| Example No. | IMT | Proportion of fine material (%) | Granulate stability | Dust value | Mp. (°C.) | Content (%) | Optical assessment |
| --- | --- | --- | --- | --- | --- | --- | --- |
| 4 | 0.5 | 3.0 | 69 | 2 | 170-77 | 96.6 | uniform |
| 5 | 1 | 1.0 | 41 | 2 | 171-78 | 97.5 | uniform |
| 6 | 0 | 1.2 | 47 | 2 | 171-78 | 96.6 | uniform |

TABLE VIIa

Granulation of CZ

| Example No. | Type of sample pre-treatment | Lubricant (%) | powder moisture | Machine No. | Nozzle No. | Specific granulation work (Wh/kg) | Max throughput (kg/h) | FIG. no. |
| --- | --- | --- | --- | --- | --- | --- | --- | --- |
| 7 | mixing | 1.0 L-3 | 17.0 | 3 | 3.1 | 27.5 | 370 | 5 |
| 8 | mixing | 1.0 L-3 | 20.3 | 3 | 3.1 | 8.3 | 270 | 5 |
| 9 | mixing | 0.15 L-3 | 25 | 3 | 3.1 | 4.8 | 200 | 4 |
| 10 (not according to the invention) | mixing | 0.3 L-3 | 25 | 3 | 3.1 | 0.9 | 150 | 4 |

TABLE VIIb

Granulate characteristics of CZ

| Example No. | IMT | Proportion of fine material (%) | Granulate stability | Dust value | Mp. (°C.) | Content (%) | Residual amine content (%) | Optical assessment |
| --- | --- | --- | --- | --- | --- | --- | --- | --- |
| 7 | 0.5 | 0.4 | 41.7 | 0 | 104 | 95 | 0.4 | uniform |
| 8 | 1 | 0.9 | 32.8 | 0 | 104 | 96.1 | 0.5 | uniform |
| 9 | 1 | 0.5 | 55 | 2 | 104 | 96.7 | 0.5 | uniform |
| 10 (not according to the invention) | 0.5 | 70.3 | 75 | — | 104 | 96.5 | 0.5 | uniform |

EXAMPLES 11 TO 15

Granulation of NZ
Table VIII, a, b
FIG. No. 6

A comparison of Example 11 with Example 13 shows how the specific granulation work falls from 21.8 to 10.0 Wh/kg by increasing the powder moisture from 16.2 to 21%, while otherwise under the same conditions, the granulate stability also deteriorating in a parallel manner from 28 to 61. An analogous behaviour becomes evident when comparing Examples 12 and 14. It is not possible to compare Examples 11 with 12 or 13 with 14, because several parameters, such as quantity of lubricant, powder moisture, nozzle shape and compression ratio were simultaneously changed.

EXAMPLES 15 TO 17

Influence on the gap spacing between the nozzle plate and screw end on the specific granulation work, illustrated using NZ.

Figure 7:
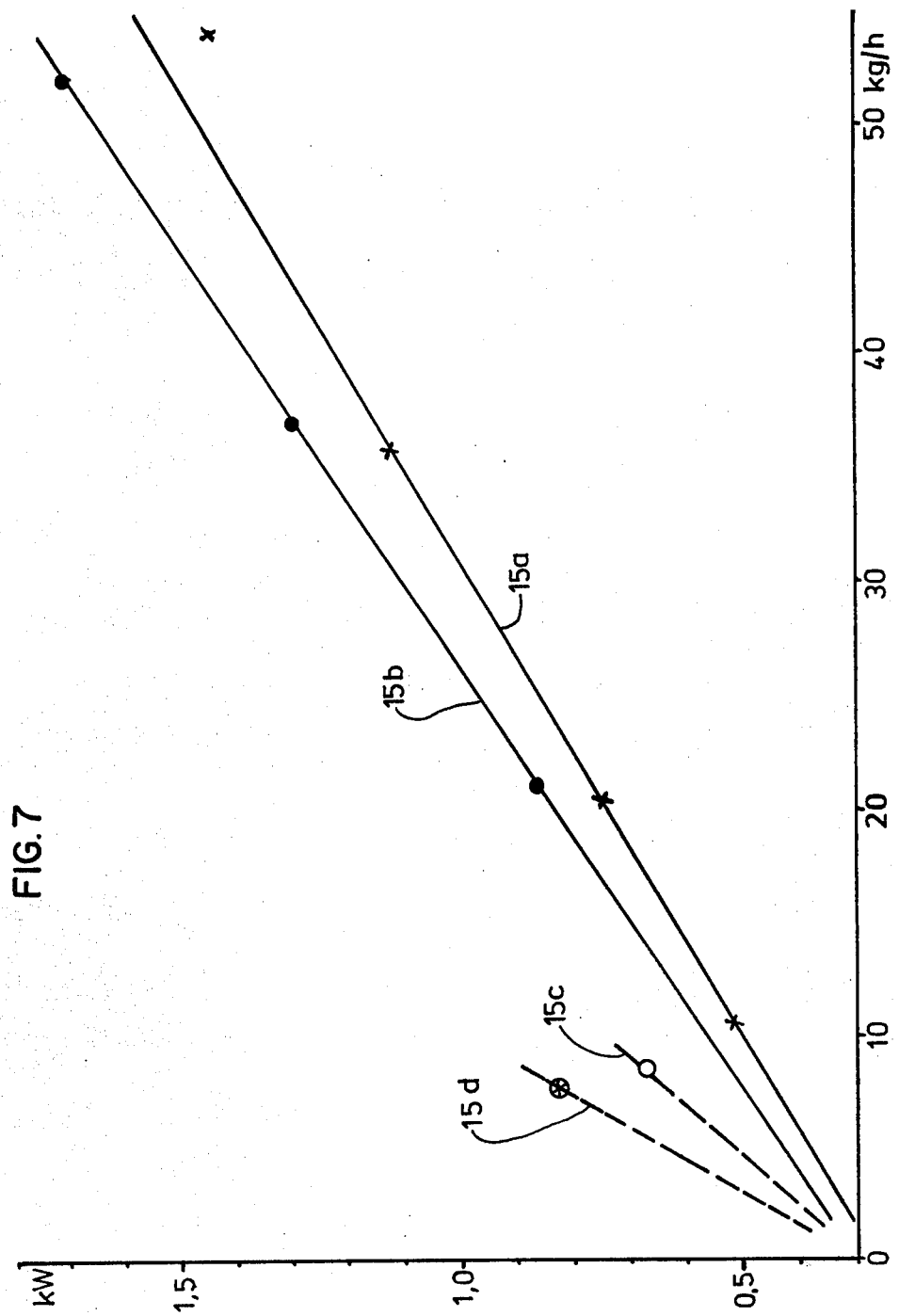
FIG. 7 is a plot similar to FIG. 2 for Examples 15 a,b,c and d.
Figure 8:
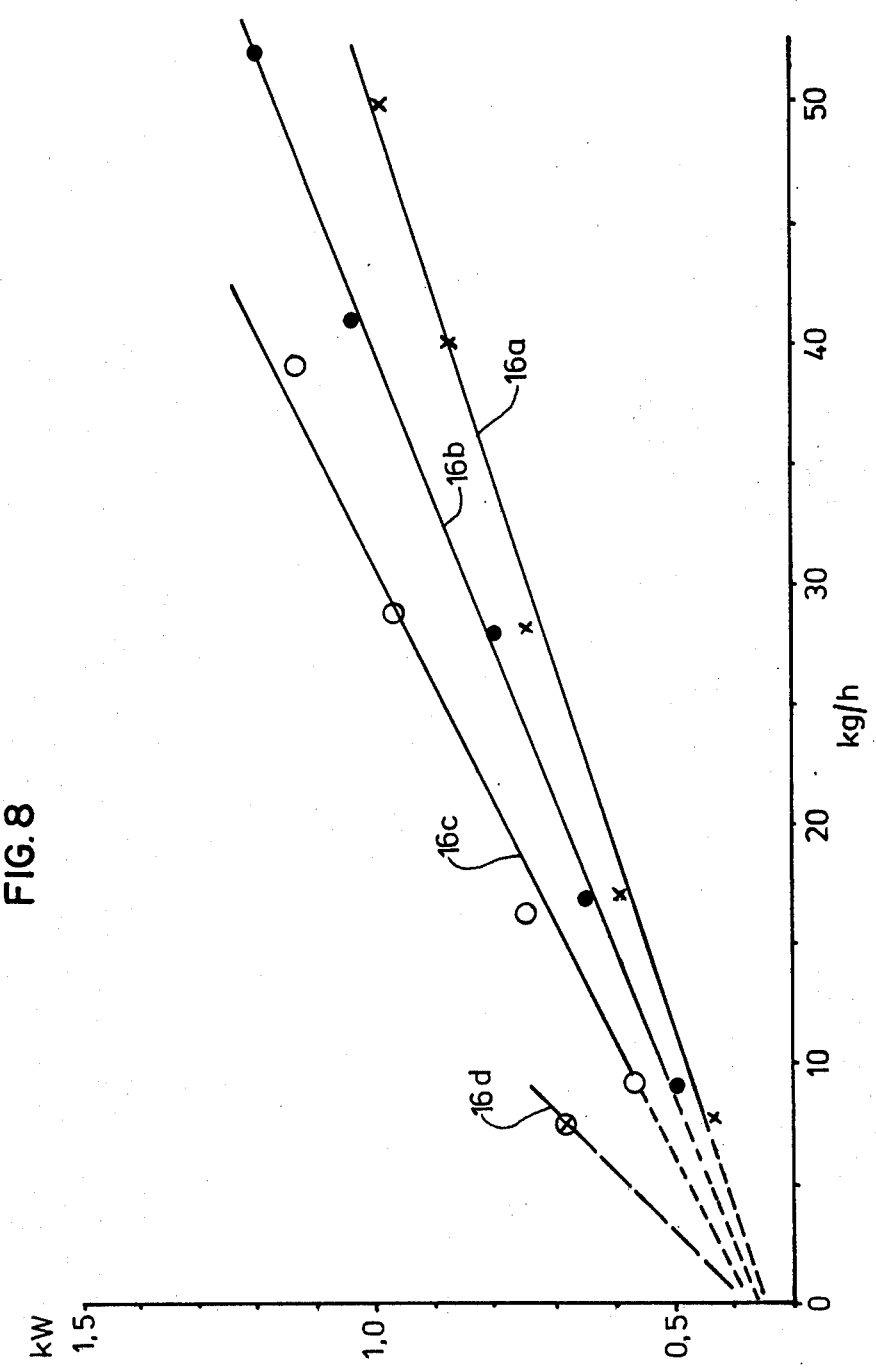
FIG. 8 is a plot similar to FIG. 2 for Examples 16 a,b,c and d.
Figure 9:
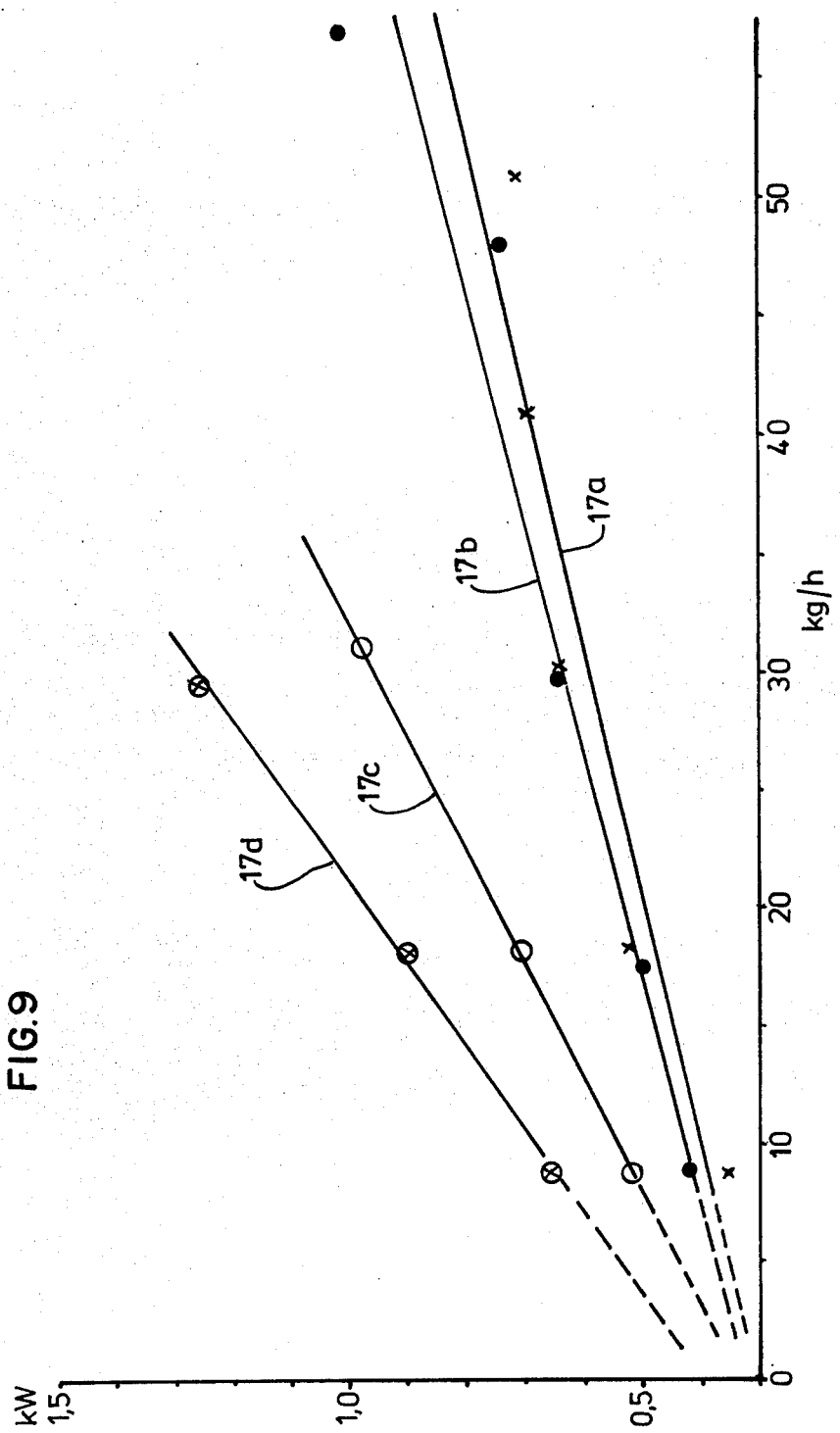
FIG. 9 is a plot similar to FIG. 2 for Examples 17 a,b,c and d.

FIGS. 7 to 9.
Arrangement of machine:
Distance rings varying in thickness were positioned between the end of the screw cylinder and the nozzle plate. Since the screw ends are in a plane with the cylinder ends, the thickness of the distance ring is practically identical to the distance between the nozzle plate and the screw ends.

The results are assembled in Table IX or in FIGS. 7 to 10.

Figure 10:
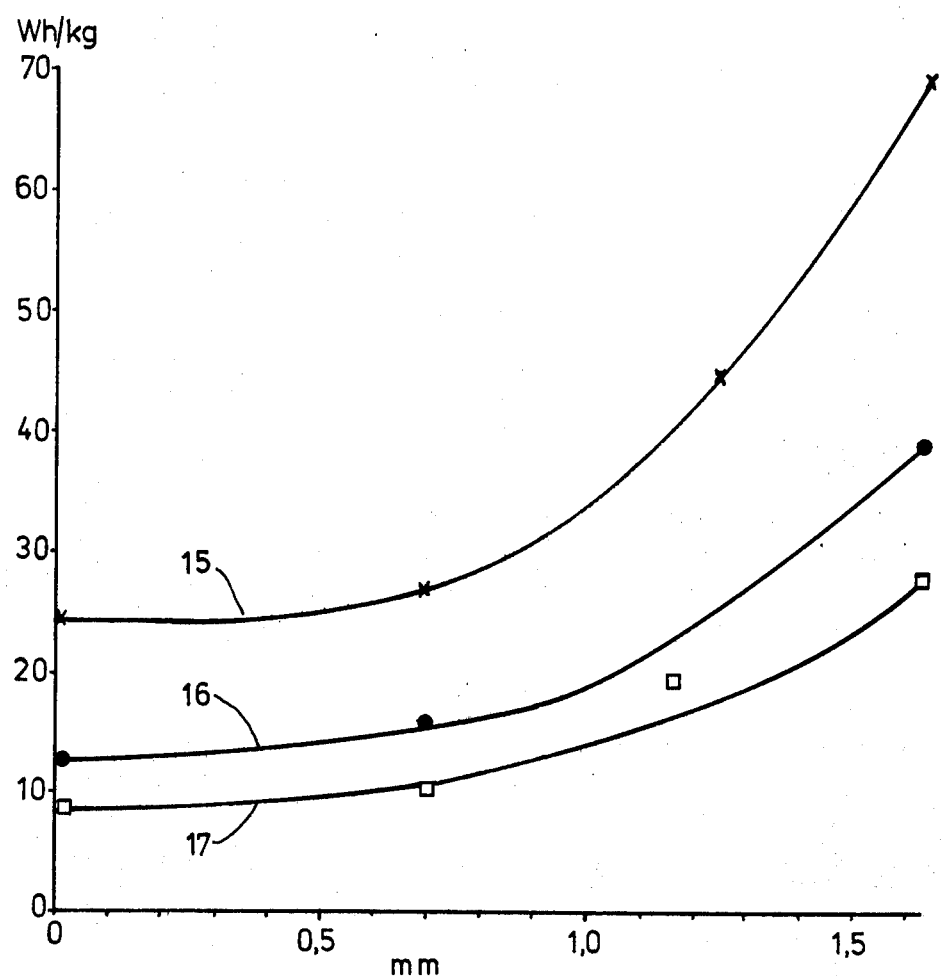
FIG. 10 is a plot of the relationship between (a) the gap spacing between the nozzle plate and screw end of the machine and (b) the specific granulation work for Examples 15, 16 and 17.

It is seen how the specific granulation work rapidly increase with an increasing gap spacing. In FIG. 10 this connection is illustrated particularly clearly: the specific granulation work only slightly increases up to a gap width of 0.7 mm in order to then increase beyond proportionally. This increase is greater with the less slidable mixture of Example 15 than with the mixtures of Examples 16 and 17. A comparison of these two experiments shows the influence of the compression ratio on the specific granulation work otherwise under identical experimental conditions: the specific granulation work in Example 16 where $K_D=1:4.1$ are higher than in Example 17 where $K_D=1:2.9$, otherwise under the same conditions.

Examples 15 to 17 show how it is possible to influence the granulation behaviour by parameters in terms of the machine.

TABLE VIIIa

Granulation of NZ

| Example No. | Type of sample preparation | Lubricant (%) | Powder moisture (%) | Machine No. | Nozzle No. | Specific granulation work (Wh/kg) | FIG. No. |
| --- | --- | --- | --- | --- | --- | --- | --- |
| 11 | mashing | 1.5 L-3 | 16.2 | 1 | 1.1 | 21.8 | 6 |
| 12 | mashing | 2.5 L-3 | 15.3 | 1 | 1.3 | 22.2 | 6 |
| 13 | mashing | 1.5 L-3 | 21.0 | 1 | 1.3 | 10.3 | 6 |
| 14 | mashing | 1.5 L-3 | 21.0 | 1 | 1.3 | 10.3 | 6 |

TABLE VIIIb

Granulation characteristics of NZ

| Example No. | IMT | Granulate stability | Dust value | Optical assessment |
| --- | --- | --- | --- | --- |
| 11 | 0.5 | 28 | 2 | uniform |

TABLE VIIIb-continued

| | Granulation characteristics of NZ | | | |
|---|---|---|---|---|
| Example No. | IMT | Granulate stability | Dust value | Optical assessment |
| 12 | 1 | 28 | 2 | uniform |
| 13 | 0.5 | 61 | 2 | uniform |
| 14 | 1 | 53 | 2 | uniform | the concentration of lubricant, when all the other parameters are maintained constant.

If the experimental points of Examples 18 and 19 are not only calculated graphically, but mathematically according to the method of the least squares, then the following relations are obtained.

$$N_{el} = A_{spec.} \times D + N_o$$

TABLE IX

Influence of the gap spacing to the nozzle with NZ

| Example | Type of sample preparation | Lubricant (%) | Powder moisture (%) | Machine No. | Nozzle No. | FIG. no. | Gap spacing (mm) | Specific granulation work (Wh/kg) | Comments |
|---|---|---|---|---|---|---|---|---|---|
| 15 a | mixing | 1 L-5 | 16.5 | 1 | 1.2 | 7 | 0 | 24.3 | |
| 15 b | mixing | 1 L-5 | 16.5 | 1 | 1.2 | 7 | 0.7 | 27.0 | Heating the granulate |
| 15 c | mixing | 1 L-5 | 16.5 | 1 | 1.2 | 7 | 1.1 | 45 | Dehydrating the moist powder |
| 15 d | mixing | 1 L-5 | 16.5 | 1 | 1.2 | 7 | 1.6 | 70 | Machine stops |
| 16 a | mixing | 0.5 L-3 | 21.2 | 1 | 1.3 | 8 | 0 | 13.0 | |
| 16 b | mixing | 0.5 L-3 | 21.2 | 1 | 1.3 | 8 | 0.7 | 16.3 | |
| 16 c | mixing | 0.5 L-3 | 21.2 | 1 | 1.3 | 8 | 1.1 | 20.3 | |
| 16 d | mixing | 0.5 L-3 | 21.2 | 1 | 1.3 | 8 | 1.6 | 40 | Considerable heating of granulate |
| 17 a | mixing | 0.5 L-3 | 21.2 | 1 | 1.2 | 9 | 0 | 9.3 | |
| 17 b | mixing | 0.5 L-3 | 21.2 | 1 | 1.2 | 9 | 0.7 | 10.3 | |
| 17 c | mixing | 0.5 L-3 | 21.2 | 1 | 1.2 | 9 | 1.1 | 20.5 | |
| 17 d | mixing | 0.5 L-3 | 21.2 | 1 | 1.2 | 9 | 1.6 | 28.5 | Considerable heating of granulate |

EXAMPLES 18 and 19

Figure 11:
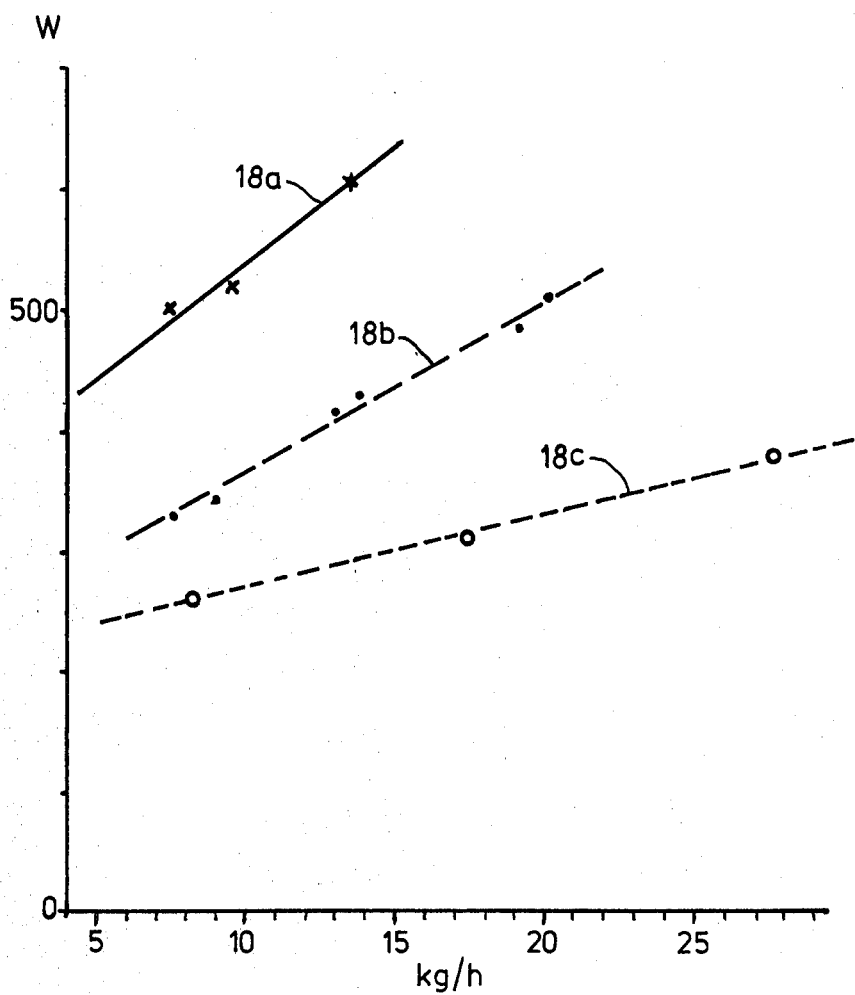
FIG. 11 is a plot similar to FIG. 2 for Examples 18 a,b and c.
Figure 12:
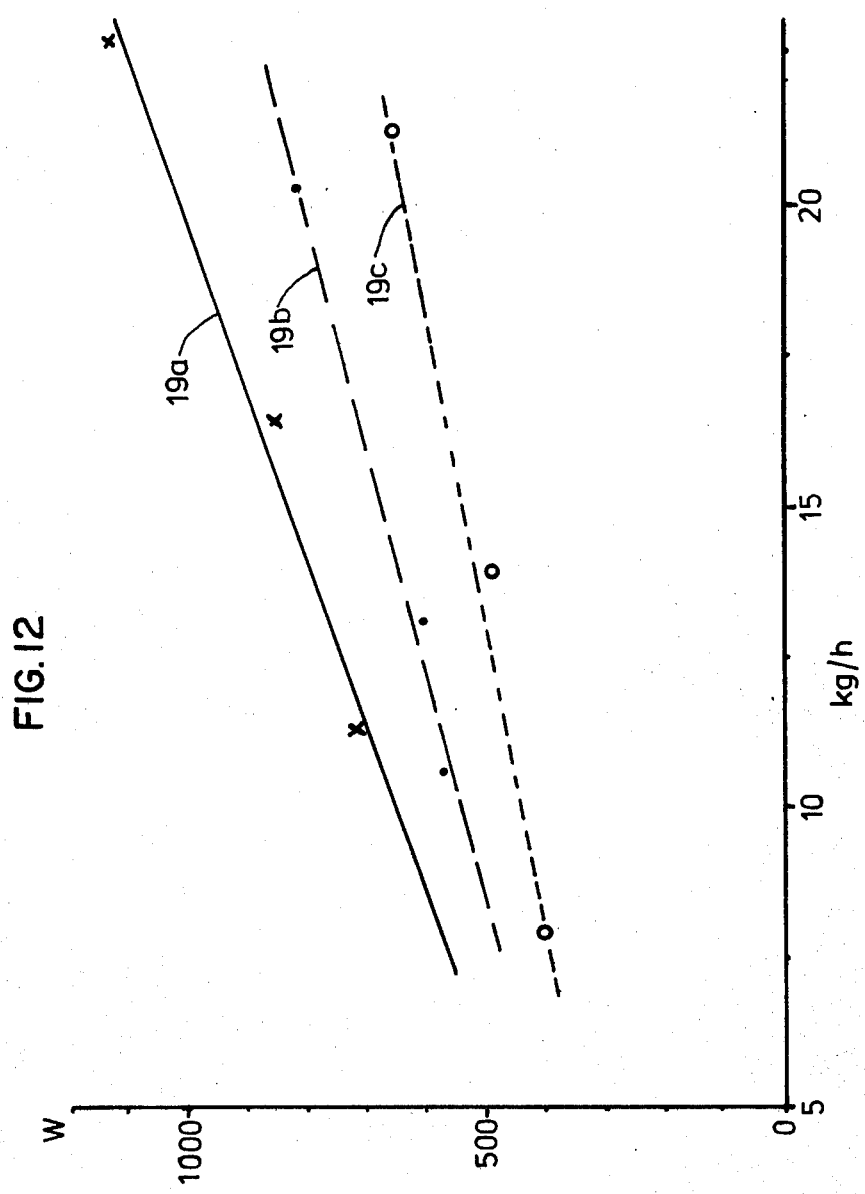
FIG. 12 is a plot similar to FIG. 2 for Examples 19 a,b and c.

Granulation of D
Table X a and b
FIGS. 11 and 12
Gap spacing of nozzle plate to screw end: 0.2 mm Examples 18 and 19 show with three moist material settings, the influence of the lubricant proportion (emulsifier L-3, used in this case) on the specific granulation work. The increasing quantity of lubricant causes a decreasing specific granulation work.

| Example No. | $N_{el}$ (W) |
|---|---|
| 18 a | 18.04 D + 354.7 |
| 18 b | 13.39 D + 231.4 |
| 18 c | 6.25 D + 205.0 |
| 19 a | 36.03 D + 291.8 |
| 19 b | 26.09 D + 281.2 |
| 19 c | 19.62 D + 231.7 |

$N_{el}$: electrical power consumption (W)
$N_o$: ordinate intercept giving the electrical power consumption with zero conveyance, "zero power". (W)
$A_{spec.}$: Specific granulation work (Wh/kg)
D: Throughput (kg/h)

TABLE Xa

Granulation of D

| Example No. | Process of sample pre-treatment | Lubricant (%) | Powder moisture (%) | Granulation machine No. | Nozzle No. | Specific granulation work (Wh/kg) | Max throughput (kg/h) | FIG. no. |
|---|---|---|---|---|---|---|---|---|
| 18 a | mixing | 0 | 30 | 1 | 1.2 | 18.0 | 14 | 11 |
| 18 b | mixing | 0.5 L-3 | 30 | 1 | 1.2 | 13.4 | 20 | 11 |
| 18 c | mixing | 1 L-3 | 30 | 1 | 1.2 | 6.0 | 23 | 11 |
| 19 a | mixing | 0 L-3 | 26 | 1 | 1.2 | 36.0 | 23 | 12 |
| 19 b | mixing | 0.5 L-3 | 25 | 1 | 1.2 | 26.1 | 20 | 12 |
| 19 c | mixing | 1.0 L-3 | 25 | 1 | 1.2 | 19.5 | 21 | 12 |

Figure 13:
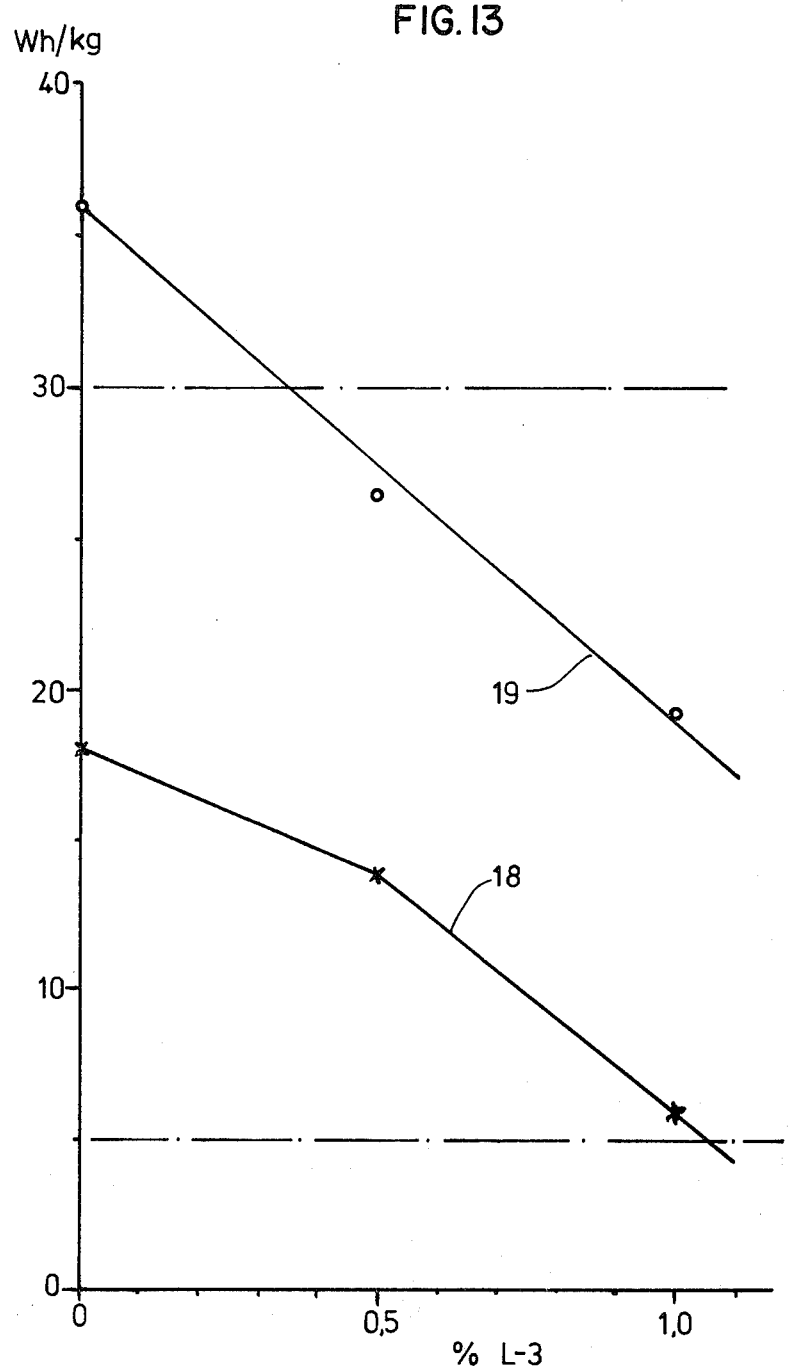
FIG. 13 is a plot of the relationship between the quantity of lubricant and the specific granulation work for Examples 18 and 19.

FIG. 13 plainly shows this connection. The specific granulation work is in practically linear dependence on TABLE Xb Granulate characteristics of D

| Example No. | IMT | Proportion of fine material (%) | Granulate stability (%) | Dust value | Mp. (°C.) | Content (°C.) | Optical assessment |
|---|---|---|---|---|---|---|---|
| 18 a | 1–1.5 | 1.67 | 23.1 | 1 | 145–48 | 99.3 | uniform |
| 18 b | 0.5 | 0.2 | 7.5 | 2 | 145–48 | 99.0 | uniform |
| 18 c | 0.5 | 0 | 5.8 | 1 | 144–47 | 98.5 | uniform |
| 19 a | 3 | 1.3 | 24.6 | 2 | 145–48 | 99.2 | not according |

TABLE Xb-continued

| | | Granulate characteristics of D | | | | | |
|---|---|---|---|---|---|---|---|
| Example No. | IMT | Proportion of fine material (%) | Granulate stability (%) | Dust value | Mp. (°C.) | Content (°C.) | Optical assessment |
| 19 b | 1 | 0.5 | 21.6 | 2 | 144–47 | 99.1 | to the invention uniform |
| 19 c | 1 | 0.1 | 10.8 | 2 | 144–47 | 98.7 | uniform |

It is seen that the "zero power" $N_o$ is dependent on the quantity of lubricant used. A higher content of lubricant in addition to the specific granulation energy, also reduces the "zero power".

Figure 14:
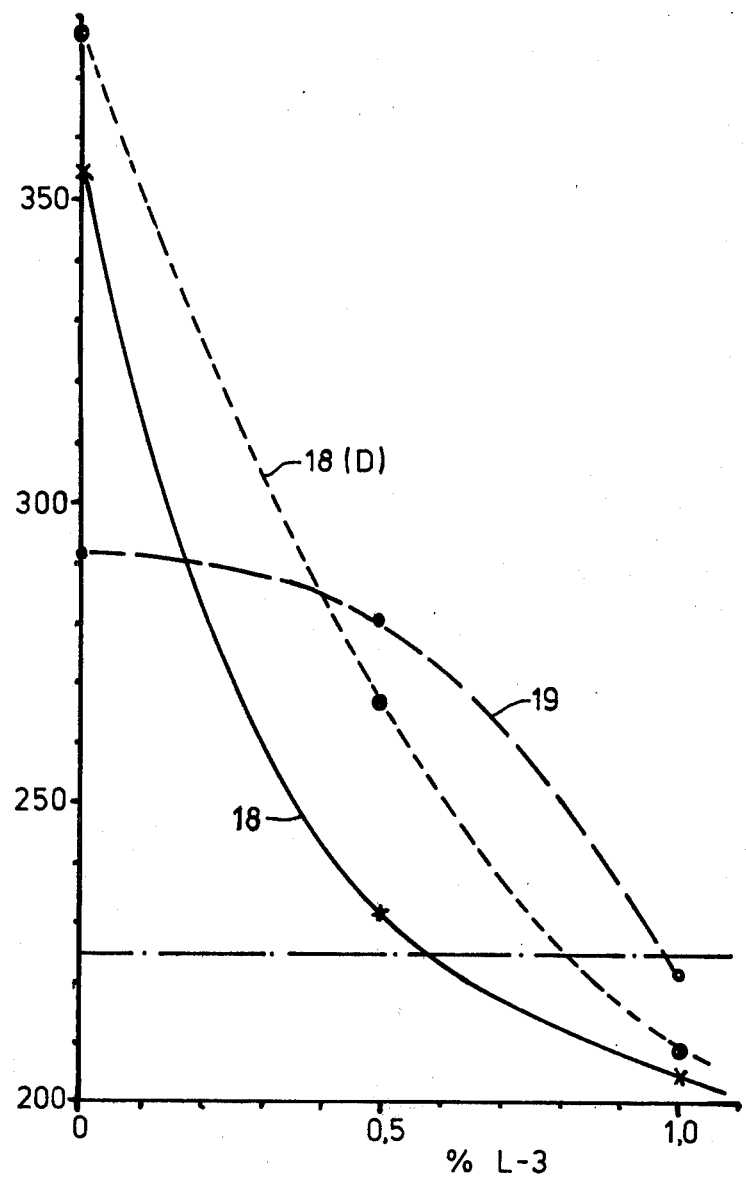
FIG. 14 is a plot of the relationship between the quantity of lubricant and the electrical power consumption for Examples 18 and 19.

This relationship is presented in FIG. 14. A reproduction of the experiment of Example 18 using D with a somewhat smaller average grain size (20 µm) and a change in the grain size distribution in favour of the fine portion was also plotted. The straight horizontal line at 225 W corresponds to the "zero power" of the unfilled granulation extruder, extrapolated at zero speed. The lubrication effect of the moist powder containing lubricant is clearly seen when comparing the experimental curves with the zero power of the machine.

EXAMPLE 20

Granulation of D using machine 2

For technical reasons, it was impossible to determine the power consumption dependence on the throughput and thus the specific granulation work on machine 2. The experiments were used primarily for determining the maximum throughput and the granulate characteristics:

| Experimental data | Example 20 a | Example 20 b |
|---|---|---|
| Moistness of the powder | 32% | 34% |
| Lubricant | 0.5% L-3 | 0.5% L-3 |
| Current consumption | 2–3 kW | 2.2–2.8 kW |
| Granulation duration | 138 min | 70 min |
| Throughput quantity of Moist material | 302 kg/h | 291 kg/h |
| Granulate characteristics | | |
| IMT | 0 | 0 |
| Granulate stability | 28 | 38 |
| Dust value | 0 | — |
| Mp. | 145–148° C. | 144–147° C. |
| Evaporation loss | 0.15% | 0.25% |
| Ash proportion | 0.06 | 0.1 |
| Content of active substance | 98.4% | 97.9% |

EXAMPLE 21

Influence of the ratio of nozzle channel length to nozzle channel diameter (1/d-ratio) on the specific granulation work.

| substrate | D from Example 18 b |
|---|---|
| machine | 1 |
| Gap spacing between nozzle and screw end | 0.7 mm |

Each bore of a nozzle plate (106 holes, 2 mm hole diameter, 9.5 mm plate thickness =1/d=4.75) was drilled from the outside in stages to 3 mm so that the effective nozzle channel length was 9.5; 8; 6 and 4 mm; the corresponding 1/d-ratios are 4.75; 4; 3 and 2.

| 1/d-ratio | $A_{spec.}$ (Wh/kg) |
|---|---|
| 4.75 | unmeasurable, granulator is blocked |
| 4.0 | 31 |
| 3.0 | 21 |
| 2.0 | 24 |

The 1/d-ratio of from 2.0 to 3.0 is recognised as being the optimum range. In the case of larger values, the specific granulation work increases steeply. The result is typical of the machine, with machine 3 (nozzle 3.1), an outstanding manner of granulation may be effected where 1/d=5, see Examples 5 to 9.

EXAMPLE 22

| Granulation of Vulkuren-2 | |
|---|---|
| Machine | 1 |
| Nozzle plate | 1.5 |
| Sample pre-treatment | mashing |
| Lubricant | 2.5% L-3 |
| Powder moisture | 18.6 |
| Specific granulation work | 13.4 Wh/kg |
| FIG. no. | 15 |
| Granulate characteristics of Vulkuren-2 | |
| Intermixing test | 0.5 |
| Dust value | 2 |
| Proportion of fine material | 3 |
| Granulate stability | 69.9 |
| Mp. | 128–30° C. |
| Optical assessment | Uniform |

EXAMPLE 22

| Granulation of DZ | |
|---|---|
| Machine | 1 |
| Nozzle plate | 1.3 |
| Sample pre-treatment | Mixing |
| Lubricant | 2,5% L-3 |
| Powder moisture | 18,6% |
| Spec. granulation work | 11 Wh/kg |
| FIG. no. | 15 |
| Granulate characteristics DZ | |
| Intermixing test | 1 |
| Dust value | 0 |
| Proportion of fine material | <1 |
| Granulate stability | 45 |
| Optical assessment | uniform |

EXAMPLE 24

| Parameter | Example 24 a | Example 24 b |
|---|---|---|
| Granulation of TMS | | |
| Machine | 1 | 1 |
| Nozzle plate | 1.3 | 1.3 |
| Sample preparation | mixing | mixing |
| Lubricant | 0.5% L-5 | 0.5% L-7 |

-continued

| Parameter | Example 24 a | Example 24 b |
|---|---|---|
| Powder moisture | 14.9% | 14.9% |
| Spec. granulation work | 8.7 Wh/kg | 10.3 Wh/kg |
| FIG. no. | 16 | 16 |
| Granulate characteristics of TMS | | |
| Intermixing | 0.5 | 0.5 |
| Dust value | 0 | 0 |
| Proportion of fine material | <0.1 | 0.1 |
| Granulate stability | 14.3 | 20.6 |
| Optical assessment | uniform | uniform |
| Mp. | 108° C. | 108° C. |

We claim:

1. A process for the production of granulate-form agglomerates comprising mixing the pulverulent rubber chemicals of a maximum primary grain size of 500 μm with a moistening agent and/or a lubricant and supplying them to a double shaft screw granulator with forced conveyance, in which the spacing between the nozzle plate and the vertically cut screw ends is between 0,1 and 1.0 mm, whereby the compression ratio $K_D$ is between 1:4,5 and 1:2,5 and the ratio of nozzle channel length to nozzle channel diameter is between 2 and 5, and whereby the specific granulation work is from 2 to 40 Wh/kg, forcing the rubber-chemicals axially through a nozzle perforating plate, severing the issuing strands or allowing them to break-off and are then drying them.

2. A process according to claim 1, wherein the specific granulation work is from 5 to 30 Wh/kg.

3. A process according to claim 1, wherein the pulverulent rubber chemicals are mixed with from 10 to 40% by weight of moistening agent and from 0 to 2% by weight of lubricant, based on the solid substance portion.

4. A product produced by the process of claim 1.

5. A process according to claim 1, wherein the pulverulent rubber chemicals are mixed with from 5 to 50% by weight of moistening agent and/or from 0 to 5% of lubricant, based on the solid substance portion.

6. A product produced by the process of claim 5.

* * * * *